Patented Nov. 15, 1949

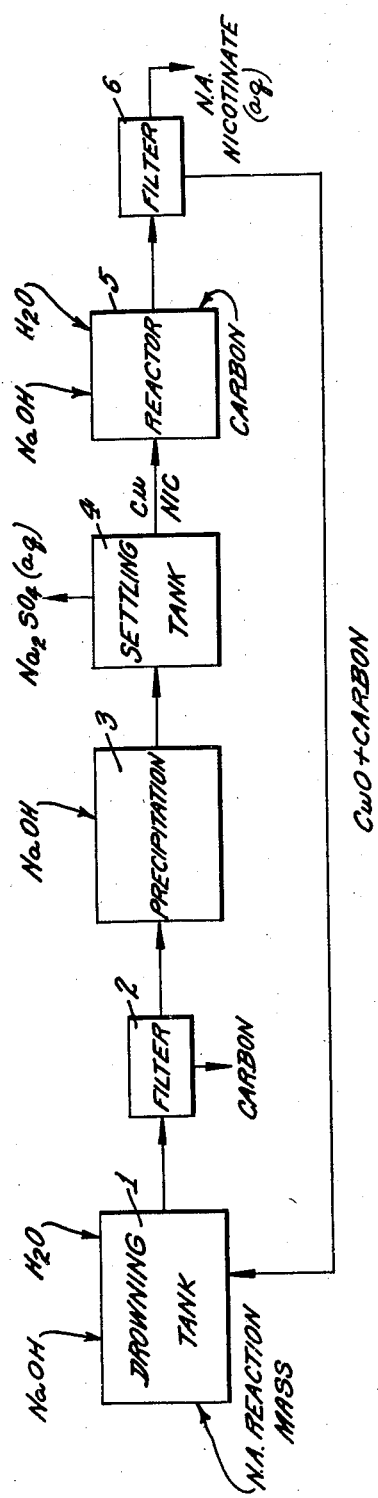

2,487,874

UNITED STATES PATENT OFFICE 2,487,874

RECOVERY OF PYRIDINE CARBOXYLIC ACID

Francis C. Huber, Riverton, N. J., assignor to Allied Chemical & Dye Corporation, New York, N. Y., a corporation of New York Application December 10, 1945, Serial No. 634,048

5 Claims. (Cl. 260—295.5)

This invention relates to recovery of pyridine carboxylic acids particularly nicotinic acid, from reaction masses containing such substances in admixture with a strong inorganic acid such as sulfuric acid or nitric acid.

Pyridine carboxylic acids, e. g. nicotinic acid, may be advantageously produced by oxidation of an N-heteroaryl compound having an oxidizable organic grouping attached to the nitrogen-containing aromatic nucleus by one or more carbon-to-carbon linkages, e. g. quinoline or beta-picoline, with sulfuric acid, with nitric acid, preferably in a sulfuric acid reaction medium, or with a mixed sulfuric acid-nitric acid oxidizing agent. The product obtained from such oxidation is a mixture of the desired carboxylic acid with the excess inorganic acid, so that to recover the carboxylic acid in pure form, it is necessary to separate it substantially completely from the inorganic acid. It has been proposed to recover pyridine carboxylic acids from reaction mixtures such as those above described by precipitation from the mixture of the insoluble copper salts of the acids. The economy of this procedure would be materially improved if it were possible to re-use the copper, particularly if such re-use could be accomplished without requiring an independent recovery system.

It is an object of this invention to provide an integrated process for recovering pyridine carboxylic acids from mixtures thereof with strong inorganic acids such as nitric acid or sulfuric acid which may be operated economically.

In accordance with this invention recovery of a pyridine carboxylic acid from a mixture thereof with a strong inorganic acid is carried out as follows: The mixture of the pyridine carboxylic acid and inorganic acid is drowned by addition thereof to water. When at least a substantial portion, preferably between about 40% and about 100%, e. g. about 75%, of the mixture has been added to the drowning medium, copper oxide recovered as hereinbelow described is added to the drowning mass, the copper oxide reacting with the inorganic acid to form a soluble copper salt; the amount of copper oxide added should be such that the pH value of the drowned mass does not exceed about 0.2. Drowning of the mixture may then be completed, and the drowned mass is filtered to remove insoluble matter. An alkaline material is then added to the filtrate until the pH value thereof is between about 2.5 and 7.0, within which range the copper salt reacts with the pyridine carboxylic acid to precipitate the copper salt of the acid. The insoluble copper salt of the carboxylic acid thus obtained is recovered and reacted with an aqueous caustic alkali, whereby an aqueous solution of an alkali metal salt of the pyridine carboxylic acid is obtained; the copper oxide concurrently formed precipitates and is recycled to the drowning operation above described. The pyridine carboxylic acid may be recovered from its alkali metal salt by acidification.

The reaction mass which may be treated in accordance with the process of this invention may be obtained by catalytic oxidation of a N-heteroaryl compound having an oxidizable organic grouping attached to the nitrogen-containing aromatic nucleus by one or more carbon-to-carbon linkages, e. g. quinoline or beta picoline, with sulfuric acid; the substance used to catalyze such oxidation may be mercury or a mercury salt soluble in sulfuric acid, preferably admixed with a copper salt soluble in sulfuric acid; selenium or a selenium compound soluble in sulfuric acid, alone or in admixture with an alkali metal halide such as potassium bromide; or halogens, hydrogen halides or halogen-containing compounds which react with sulfuric acid at 50° C. to yield free halogens or hydrogen halides. A reaction mass obtained by oxidizing an N-heteroaryl compound of the type described with nitric acid in the presence of sulfuric acid, and, if desired, in the presence of a selenium or mercury catalyst, may also be treated in accordance with this invention; further, a reaction mass obtained by oxidizing an N-heteroaryl compound of the type described with a mixed nitric-sulfuric acid oxidizing agent (i. e. an agent in which both acids are consumed during the course of the oxidation) may be treated, as well as one obtained by oxidizing a suitable N-heteroaryl compound such as nicotine with nitric acid alone. This invention is particularly applicable to treatment of reaction masses formed upon oxidizing N-heteroaryl compounds of the type described in the presence of sulfuric acid and a selenium catalyst which forms an insoluble precipitate upon drowning the reaction mass in water.

While the above process is applicable to recovery of pyridine carboxylic acids generally, it is of particular use in the recovery of nicotinic acid, the most important and valuable of such carboxylic acids, and hence the subsequent description of the process refers to its employment for recovery of nicotinic acid; further, since the preferred methods of producing nicotinic acid result in production of a mixture of that acid with sulfuric acid, the subsequent description refers to separation of nicotinic acid from sulfuric acid, although it is to be understood separation from nitric acid or other strong inorganic acid could be effected in substantially the same manner.

The accompanying drawing represents a flow sheet describing operation of a preferred embodiment of the process of this invention for recovery of nicotinic acid. As shown in the drawing, the nicotinic acid reaction mass admixed with sulfuric acid (referred to in the drawing as N. A. reaction mass) is introduced into drowning tank 1, wherein it is drowned in water. When at least a substantial portion, preferably between about 40% and about 100%, e. g. about 75%, of the reaction mass has been introduced into drowning tank 1, a mixture of copper oxide and activated carbon obtained as hereinafter described is introduced into the tank in amounts such that the pH value of the drowned mass does not exceed 0.2; the addition of approximately the stoichiometric amount of copper oxide required to react with the nicotinic acid in the reaction mass is suitable. After addition of the copper oxide, drowning of the nicotinic acid reaction mass is continued until completed. The drowned mass may then be adjusted to a pH value of about 1 by the addition of an alkali such as sodium hydroxide in order to reduce the corrosiveness of the drowned mass. The drowned mass is then filtered in filter 2 to remove the activated carbon, which is discarded, together with other insoluble material such as selenium catalyst.

The filtrate from filter 2 is then introduced into precipitator 3. If a test at this point shows insufficient copper to precipitate all the nicotinic acid, the deficiency can be made up by the addition of a copper salt such as copper sulfate. An alkaline material, e. g. sodium hydroxide, is then slowly added to precipitator 3 until the pH value of the solution reaches 2.5 to 7.0, preferably 3.5 to 4.0, whereupon copper nicotinate precipitates; during this addition the aqueous mass is preferably maintained in a boiling condition. The slurry thus formed is transferred to a settling tank 4, wherein the copper nicotinate is recovered by decanting the aqueous sodium sulfate solution; the copper nicotinate may then be washed with water to free it of sulfates.

The copper nicotinate from settling tank 4 is slurried with water in reactor 5, and aqueous sodium hydroxide is slowly added to the reactor with agitation, the temperature being maintained between about 90° and about 100° C., until the pH value of the mixture reaches 9.5 to 10; under these conditions the sodium hydroxide reacts with the copper nicotinate to form an aqueous solution of sodium nicotinate and precipitate copper oxide. Activated carbon is added to the solution and the mixture thoroughly agitated in order to improve its color. The mass is then passed to filter 6, wherein the aqueous solution of sodium nicotinate is recovered as filtrate and treated as desired to recover nicotinic acid. The copper oxide-carbon filter cake is recycled to drowning tank 1 described above.

It has been found that an important feature of the process of this invention is to defer addition of copper oxide to the drowning tank until a substantial portion of the reaction mass has been drowned. Addition of copper oxide at the beginning of the drowning operation results in the formation of copper nicotinate in the drowning tank which does not redissolve, so that upon filtration in filter 2 to remove carbon and other insoluble matter, the undissolved copper nicotinate is also removed, reducing the yield of nicotinic acid. By adding the copper oxide to the drowning operation in accordance with this invention, however, loss of nicotinic acid in this manner is completely avoided.

The term "strong inorganic acid" is employed throughout the specification and claims to refer to acids such as sulfuric, nitric and hydrochloric acids.

Since certain changes may be made in the above process without departing from the scope of the invention, it is intended that all matter contained in the above description shall be interpreted as illustrative and not in a limiting sense.

I claim:

1. A process for the recovery of a pyridine carboxylic acid from a reaction mixture containing said acid in admixture with a strong inorganic acid, which comprises drowning said reaction mixture in water, adding copper oxide to the resulting mass after at least a substantial portion of the reaction mixture has been drowned and in such amount that the pH value of the drowned mass does not exceed about 0.2 removing insoluble matter from the drowned mass, adjusting the pH value of the drowned mass to between about 2.5 and about 7.0 to precipitate the copper salt of the pyridine carboxylic acid, separating the copper salt of the pyridine carboxylic acid from the reaction mass and reacting said salt with an aqueous caustic alkali to form the alkali metal salt of the pyridine carboxylic acid and copper oxide, and recycling the copper oxide thus formed to the drowning operation.

2. A process for the recovery of a pyridine carboxylic acid from a reaction mixture containing said acid in admixture with sulfuric acid, which comprises drowning said reaction mixture in water, adding copper oxide to the resulting mass after at least a substantial portion of the reaction mixture has been drowned, and in such amount that the pH value of the drowned mass does not exceed about 0.2, removing insoluble matter from the drowned mass, adjusting the pH value of the drowned mass to between about 2.5 and about 7.0 to precipitate the copper salt of the pyridine carboxylic acid, separating the copper salt of the pyridine carboxylic acid from the reaction mass and reacting said salt with an aqueous caustic alkali to form the alkali metal salt of the pyridine carboxylic acid and copper oxide, and recycling the copper oxide thus formed to the drowning operation.

3. A process for the recovery of nicotinic acid from a reaction mixture containing said acid in admixture with sulfuric acid, which comprises drowning said reaction mixture in water, adding copper oxide to the resulting mass after at least a substantial portion of the reaction mixture has been drowned, the amount of copper oxide added being such that the pH value of the drowned mass does not exceed 0.2, removing insoluble matter from the drowned mass, adjusting the pH value of the drowned mass to between about 3.5 and about 4.0 to precipitate copper nicotinate, separating said copper nicotinate from the reaction mass and reacting the copper nicotinate with an aqueous caustic alkali to form an aqueous solution of the alkali metal nicotinate and copper oxide, and recycling the copper oxide thus formed to the drowning operation.

4. A process for the recovery of nicotinic acid from a reaction mixture containing said acid in admixture with sulfuric acid and selenium, which comprises drowning said reaction mixture in water, adding copper oxide to the resulting mass after at least a substantial portion of the reaction mixture has been drowned in amounts such that the pH value of the drowned mass does not exceed 0.2, filtering to remove insoluble matter, adjusting the pH value of the filtrate to between about 3.5 and about 4.0 to precipitate copper nicotinate, separating said copper nicotinate from the reaction mass and reacting the copper nicotinate with an aqueous caustic alkali to form an aqueous solution of the alkali metal nicotinate and copper oxide, and recycling the copper oxide thus formed to the drowning operation.

5. A process for the recovery of nicotinic acid from a reaction mixture containing said acid in admixture with sulfuric acid and selenium, which comprises drowning said reaction mixture in water, adding copper oxide and activated carbon to the resulting mass after between about 40% and about 100% of the reaction mixture has been drowned, the amount of copper oxide added being such that the pH value of the drowned mass does not exceed 0.2, filtering to remove insoluble matter, adding caustic alkali to filtrate until the pH value thereof reaches 3.5 to 4.0 to precipitate copper nicotinate, separating said copper nicotinate from the reaction mass and reacting the copper nicotinate with aqueous sodium hydroxide to form an aqueous solution of sodium nicotinate and copper oxide, decolorizing the slurry by agitation with activated carbon, filtering to remove the copper oxide and activated carbon and recycling the copper oxide and carbon to the drowning operation.

FRANCIS C. HUBER.

REFERENCES CITED

The following references are of record in the file of this patent:

UNITED STATES PATENTS

| Number | Name | Date |
| --- | --- | --- |
| 2,109,954 | Biswell | Mar. 1, 1930 |
| 2,009,043 | Dahlen | July 23, 1935 |
| 2,267,734 | Henke | Dec. 30, 1941 |
| 2,295,870 | Seibert | Sept. 15, 1942 |
| 2,347,410 | Hawkinson | Apr. 25, 1944 |
| 2,371,691 | Hawkinson | Mar. 20, 1945 |
| 2,392,437 | Kamp | Jan. 8, 1946 |
| 2,436,660 | Mueller | Feb. 24, 1948 |

OTHER REFERENCES

Woodward: Ind. and Eng. Chem., vol. 36, No. 6, June 1944, pp. 544–546.